US012234349B2

(12) United States Patent
Nilsson et al.

(10) Patent No.: US 12,234,349 B2
(45) Date of Patent: Feb. 25, 2025

(54) SEMICONDUCTIVE POLYMER COMPOSITION

(71) Applicant: BOREALIS AG, Vienna (AT)

(72) Inventors: Daniel Nilsson, Stenungsund (SE); Niklas Thorn, Stenungsund (SE); Annika Smedberg, Stenungsund (SE); Fredrik Skogman, Karlskrona (SE)

(73) Assignee: Borealis AG, Vienna (AT)

( * ) Notice: Subject to any disclaimer, the term of this patent is extended or adjusted under 35 U.S.C. 154(b) by 219 days.

(21) Appl. No.: 17/640,559

(22) PCT Filed: Sep. 14, 2020

(86) PCT No.: PCT/EP2020/075661
§ 371 (c)(1),
(2) Date: Mar. 4, 2022

(87) PCT Pub. No.: WO2021/048443
PCT Pub. Date: Mar. 18, 2021

(65) Prior Publication Data
US 2022/0340741 A1 Oct. 27, 2022

(30) Foreign Application Priority Data
Sep. 13, 2019 (EP) .................................... 19197253

(51) Int. Cl.
C08L 23/08 (2006.01)
C08K 3/04 (2006.01)
C08L 23/0853 (2025.01)
C08L 91/06 (2006.01)

(52) U.S. Cl.
CPC ............ C08L 23/0853 (2013.01); C08K 3/04 (2013.01); C08L 91/06 (2013.01); C08L 2203/202 (2013.01)

(58) Field of Classification Search
CPC .................................................. C08L 23/0853
See application file for complete search history.

(56) References Cited

U.S. PATENT DOCUMENTS

| | | | |
|---|---|---|---|
| 3,401,020 A | 9/1968 | Kester et al. | |
| 3,922,335 A | 11/1975 | Jordan et al. | |
| 4,340,577 A | 7/1982 | Sugawara et al. | |
| 4,391,789 A | 7/1983 | Estopinal | |
| 6,274,066 B1 * | 8/2001 | Easter | H01B 9/028 524/495 |
| 6,491,849 B1 * | 12/2002 | Easter | C08L 23/0815 252/511 |

FOREIGN PATENT DOCUMENTS

| | | | | |
|---|---|---|---|---|
| CN | 109651694 A | 4/2019 | | |
| EP | 0629222 B1 | 9/1999 | | |
| EP | 2752855 A1 | 7/2014 | | |
| JP | 11-297121 A | 10/1999 | | |
| JP | 2002363348 A * | 12/2002 | ............... | C08K 3/22 |
| KR | 10-2004-0038183 A | 5/2004 | | |
| WO | 00/62014 A1 | 10/2000 | | |
| WO | 2006/119067 A2 | 11/2006 | | |
| WO | 2011/109243 A2 | 9/2011 | | |
| WO | 2019/002449 A1 | 1/2019 | | |

OTHER PUBLICATIONS

Data Sheet—Carbon Black N351 by Harwick Standard Distribution Corporation (2024). https://harwick.com/files/tds/N351_CARBON_BLACK.PDF.*
International Search Report and Written opinion issued for Application No. PCT/EP2020/075661, dated Nov. 30, 2020, 13 pages.
Sultan, Bernt-Åke, and Erling Sorvik. "Thermal degradation of EVA and EBA—A comparison. I. Volatile decomposition products." Journal of applied polymer science 43.9 (1991): 1737-1745.
Mutsuddy, B.C. & Ford, R.G.; "Ceramic Injection Moulding", 1994, p. 73, XP-002795752.
"DuPont Elvax 450", XP-002795753, Oct. 8, 2017, 3 pages.
"Denka Black"—XP-002795754, retrieved from the Internet Nov. 19, 201, 2 pages.

* cited by examiner

Primary Examiner — Khanh T Nguyen
(74) Attorney, Agent, or Firm — Meunier Carlin & Curfman LLC

(57) ABSTRACT

The invention provides a semiconductive polymer composition comprising (a) a base polymer of ethylene vinyl acetate copolymer, (b) at least 25 wt % carbon black; and (c) at least 1 wt % of an ethylene vinyl acetate wax.

18 Claims, No Drawings

SEMICONDUCTIVE POLYMER COMPOSITION

CROSS REFERENCE TO RELATED APPLICATIONS

This application is a United States National Phase Patent Application of International Patent Application Number PCT/EP2020/075661, filed on Sep. 14, 2020, which claims the benefit of priority to EP application No. 19197253.8, filed Sep. 13, 2019, which is incorporated by reference herein in its entirety.

FIELD OF THE INVENTION

The present invention relates to a semiconductive polymer composition comprising a base polymer of ethylene vinyl acetate, EVA, a conducting component being carbon black and an ethylene vinyl acetate wax. The present invention further relates to a layer in a multi-layer cable, such as e.g. a bonded semiconductive layer in a power cable, comprising the semiconductive polymer composition, processes for preparing and/or producing the semiconductive polymer composition and a cable comprising a semiconductive layer which is/are obtained from the semiconductive polymer composition, and use of the semiconductive polymer composition for reducing the energy consumption during compounding.

BACKGROUND

In wire and cable (W&C) applications a typical cable comprises at least one conductor surrounded by one or more layers of polymeric materials. In power cable applications, including medium voltage (MV), high voltage (HV) and extra high voltage (EHV) applications, said conductor is surrounded by several layers including an inner semiconductive layer, an insulation layer and an outer semiconductive layer, in that order. To these layers, further layer(s) may be added, such as screen(s) and/or auxiliary barrier layer(s), e.g. one or more water barrier layer(s) and one or more jacketing layer(s). Furthermore, the electrical properties, which are of importance, may differ in different cable applications, as is the case between alternating current (AC) and direct current (DC) cable applications.

The insulating layer and the semiconducting layers normally consist of ethylene homo- and/or copolymers which are preferably cross-linked. LDPE (low density polyethylene, i.e. polyethylene prepared by radical polymerisation at a high pressure) cross-linked with peroxide, e.g. dicumyl peroxide, in connection with the extrusion of the cable, has become the predominant cable insulating layer material.

Typical cables are commonly produced by extruding the layers on a conductor. Such polymeric semiconductive layers are well known and widely used in dielectric power cables rated for voltages greater than 6 kV. These layers are used to provide layers of intermediate resistivity between the conductor and the insulation, and between the insulation and the ground or neutral potential.

Further, it is also known that crosslinking of polymers, e.g. polyolefins, substantially contributes to an improved heat and deformation resistance, mechanical strength, chemical resistance and abrasion resistance of a polymer. Therefore crosslinked polymers are widely used in different end applications, such as in the mentioned wire and cable (W&C) applications.

The semiconductive layers are widely used in dielectric power cables rated for voltages greater than 6 kV. The purpose of a semiconductive layer is to provide a smooth interface to the electric field in the insulation thereby prolonging the service life, i.e. long term viability, of a power cable i.a. by preventing partial discharge at the interface of conductive and dielectric layers.

WO2011/109243 describes a conductor shield composition comprising an ethylene vinyl acetate, conductive carbon black; polyethylene glycol; and a waxy additive which can be an ethylene vinyl acetate wax. The combination of the waxy additive and PEG is said to improve electrical aging performance.

When preparing a semiconductive polymer composition for use in such semiconductive layer, the composition is compounded in a compounding process by means of a suitable compounding equipment e.g. using internal mixers such as Banbury or Bolling, continuous single screws such as BUSS mixers, or continuous twin screws such as Farrel, or continuous mixer such as Werner & Pfleiderer. The composition comprises e.g. a polymer, a conducting component such as carbon black, and optionally other additives. If the semiconductive polymer composition is to be used in a crosslinked layer, peroxide may be added to the composition e.g. in a impregnation step occurring downstream the compounding process. Subsequent to the compounding, and optionally the impregnation step, the cables are typically produced by extruding the various layers on the conductor.

Another critical characteristic is the smoothness of the semiconductive composition. The smoothness is partially influenced i.a. by carbon black (CB) which is routinely employed in such composition. An uneven distribution of the particle size of carbon black particles, for example, can reduce surface smoothness and cause localised electrical stress concentration which is a defect that can initiate a phenomenon well known as vented trees. Moreover, the surface properties and particle size of the CB may affect the surface smoothness of the semiconductive layer of a power cable. For example, it is known that the larger the CB particles, the smoother the surface of the semiconductive layer. However, increasing the particle size of a CB for improving smoothness in turn deteriorates, i.e. increases, the resistivity of the semiconductive layer material. Thus, these properties need often be balanced, especially in case of so called furnace carbon black.

During the compounding process, the composition is compounded at elevated temperatures. For this, and other reasons, the compounding process consumes a lot of energy, and a more energy efficient production of the semiconductive polymer compositions would be desirable.

SUMMARY OF INVENTION

The present inventors have now found that by adding an ethylene vinyl acetate wax to the semiconductive polymer composition, less energy consumption during compounding can be realised, without any loss in compounding output. Moreover, such a composition will have sufficient smoothness to be considered suitable for use in power cables. The inventive composition comprises a ethylene vinyl acetate wax to reduce the energy consumption during compounding of the semiconductive polymer composition compared to a conventional semiconductive polymer composition without such additive. Without wishing to be bound by any theory, it is believed that the composition provides a processability advantage, either of the composition itself, or by an improved interaction between the compounding equipment and the composition, which reduces the energy consumed by the compounding equipment during the compounding process.

Thus, viewed from one aspect the invention provides a semiconductive polymer composition comprising:

(a) a base polymer of ethylene vinyl acetate copolymer;

(b) at least 25 wt % carbon black; and (c) at least 1 wt % of an ethylene vinyl acetate wax.

It has surprisingly been found that by adding at least 1 wt % of an ethylene vinyl acetate wax, at the expense of the base polymer, the energy consumption of the compounding process decreases by as much as ~20%. This is typically achieved without the need to adjust the other compounds in the composition (such as e.g. the carbon black content). Moreover, such a composition will have sufficient smoothness to be considered suitable for use in power cables. Thus, downstream processes to the compounding step, such as e.g. the production of a cables, can be carried out without further adaptations. The ethylene vinyl acetate wax may thus be referred to as an energy reducing component resulting in a reduced energy consumption during compounding of the semiconductive polymer composition, relative a corresponding composition have no ethylene vinyl acetate wax, or a different amount of ethylene vinyl acetate wax.

Moreover, it is also known that at elevated temperatures the EVA copolymer is susceptible to thermal degradation, leading to the formation of acetic acid and unsaturations on the polymer backbone (B. Sultan et. al, J. App. Pol. Sci., Vol 43, Issue 9, p. 1737). The formation of acetic acid is not desirable as it can lead to corrosion in the production equipment. The reduced energy consumption of the compounding process may entail a reduced temperature in the compounding equipment, and thus a reduced production of acetic acid.

Viewed from a further aspect, the invention provides an article comprising semiconductive layer(s) which is/are obtained from a semiconductive polymer composition as hereinbefore defined, wherein the article is, for example, a layer in a multi-layer cable, such as a power cable layer, or a cable, e.g. a power cable. Thus, the article may be a layer in a multi-layer cable, such as a power cable layer, wherein said layer comprises a semiconductive polymer composition as hereinbefore defined. The layer may e.g. be a bonded layer in said multi-layer cable.

Viewed from another aspect, the invention provides a process for preparing a semiconductive polymer composition as hereinbefore defined by compounding. The compounding process typically comprises heating said polymer composition to a temperature greater than the melting point of at least the major polymer component(s) of the composition which usually occur at more than 10° C. above, preferably more than 25° C., above the melting point of the polymer component(s) and below the undesired degradation temperature of the components.

The invention also provides a process for producing a cable comprising the steps of: applying on one or more conductors, a layer comprising a semiconductive polymer composition as hereinbefore defined.

Viewed from one aspect the invention provides use of an ethylene vinyl acetate wax for reducing the energy consumption during compounding of a semiconductive polymer composition as hereinbefore defined, with sufficient smoothness to be considered suitable for use in power cables.

DETAILED DESCRIPTION

Definitions

Semiconductive polymer composition means herein that the polymer composition contains a conductive filler, such as e.g. carbon black in a semiconductive amount. The term semiconductive polymer composition is a well-known expression for polymer compositions used in semiconductive applications, such as in semiconductive layers of cables, as well known for a skilled person.

An ethylene vinyl acetate wax is herein defined as an ethylene vinyl acetate polymer having an average molecular weight between 800 and 12000 g/mol, preferably between 1000 and 10000 g/mol or between 1000 and 8000 g/mol, more preferably between 2000 and 4000 g/mol or between 2000 and 5000 g/mol.

The term "wax" may additionally or alternatively, be considered as a polymer having an MFR2 of above 1200 g/10 min. Thus, throughout the text, the term "ethylene vinyl acetate wax" may be replaced with the term "ethylene vinyl acetate copolymer having an MFR2 above 1200 g/10 min".

The term "polyethylene" will be understood to mean an ethylene based polymer, i.e. one comprising at least 50 wt % ethylene, based on the total weight of the polymer as a whole. The terms "polyethylene" and "ethylene-based polymer," are used interchangeably herein, and mean a polymer that comprises a majority weight percent polymerised ethylene monomer (based on the total weight of polymerisable monomers), and optionally may comprise at least one polymerised comonomer. The ethylene-based polymer may include greater than 50, or greater than 60, or greater than 70, or greater than 80, or greater than 90 weight percent units derived from ethylene (based on the total weight of the ethylene-based polymer).

The low density polyethylene, LDPE, of the invention is a polyethylene produced in a high pressure process. Typically the polymerisation of ethylene and optional further comonomer(s) in a high pressure process is carried out in the presence of an initiator(s). The meaning of the term LDPE is well known and documented in the literature. The term LDPE describes and distinguishes a high pressure polyethylene from low pressure polyethylenes produced in the presence of an olefin polymerisation catalyst. LDPEs have certain typical features, such as different branching architecture. A typical density range for an LDPE is 0.900 to 0.960 g/cm$^3$.

The term "conductor" means herein a conductor comprising one or more wires. The wire can be for any use and be e.g. optical, telecommunication or electrical wire. Moreover, the cable may comprise one or more such conductors. Preferably the conductor is an electrical conductor and comprises one or more metal wires.

Ethylene Vinyl Acetate Copolymer (a)

The ethylene vinyl acetate copolymer (a) within the context of the present invention is a polyethylene, i.e. comprises ethylene as the major monomer component. The polyethylene copolymer (a) comprises vinyl acetate as a comonomer and may contain one or more further comonomer(s). As well known "comonomer" refers to copolymerisable comonomer units.

The ethylene vinyl acetate copolymer (a) is produced in a high pressure polymerisation process, preferably by radical polymerisation in the presence of an initiator(s). Thus, the copolymer (a) is a low density polyethylene (LDPE). It is to be noted that a polyethylene produced in a high pressure (HP) is referred herein generally as LDPE and which term has a well-known meaning in the polymer field. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as high branching degree.

The preferred ethylene vinyl acetate copolymer (a) is an LDPE copolymer, i.e. a low density copolymer of ethylene, vinyl acetate and optionally one or more other comonomer(s) (referred herein as EVA copolymer). The one or more other comonomers, if present, of the EVA copolymer are preferably selected from the polar comonomer(s), non-polar comonomer(s) or from a mixture of the polar comonomer(s) and non-polar comonomer(s), as defined below. Moreover, said EVA copolymer may optionally be unsaturated. It should be understood that, if one or more other comonomers are present, the vinyl acetate comonomer is in the majority compared to any other comonomer present in the composition.

In one preferred embodiment, the one or more other comonomers comprises a polar comonomer. By "polar" comonomer, it is meant a comonomer comprising at least one polar bond and which has a net electric dipole, i.e. a region of net positive charge and a region of net negative charge.

As a polar comonomer of the one or more other comonomers, compound(s) containing hydroxyl group(s), alkoxy group(s), carbonyl group(s), carboxyl group(s), ether group(s) or ester group(s), or a mixture thereof can used. More preferably, comonomer(s) containing carboxyl and/or ester group(s) are used as said polar comonomer, if present. Still more preferably, the optional polar comonomer(s) of EVA copolymer is selected from the groups of acrylate(s), methacrylate(s) or acetate(s), or any mixtures thereof.

If present in said EVA copolymer, the polar comonomer(s) is preferably selected from the group of alkyl acrylates, alkyl methacrylates, or a mixture thereof. Further preferably, said polar comonomer(s) are selected from C1- to C6-alkyl acrylates, C1- to C6-alkyl methacrylates. Still more preferably, said polar EVA copolymer is a copolymer of ethylene with C1- to C4-alkyl acrylate, such as methyl, ethyl, propyl or butyl acrylate, or any mixture thereof, more preferably a copolymer of ethylene with methyl, ethyl or butyl acrylate, or any mixture thereof.

As the optional non-polar comonomer(s) for the EVA copolymer as the preferred copolymer (a), comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably C3 to C10 alpha-olefins, such as propylene, 1-butene, 1-hexene, 4-methyl-1-pentene; polyunsaturated (=more than one double bond) comonomer(s) such as 1,7-octadiene, 1,9-decadiene, 1,11-dodecadiene, 1,13-tetradecadiene, 7-methyl-1,6-octadiene, 9-methyl-1,8-decadiene, or mixtures thereof; a silane group containing comonomer(s); or any mixtures thereof.

As mentioned above, the EVA copolymer may optionally be unsaturated, i.e. it may comprise carbon-carbon double bonds (—C═C—). The unsaturation can be provided by one or more of the following means: by a chain transfer agent (CTA), by one or more polyunsaturated comonomer(s) or by polymerisation conditions.

That the ethylene vinyl acetate copolymer (a) is "unsaturated" means herein that the copolymer comprises carbon carbon double bonds. Carbon carbon double bonds mean herein unsaturations. The polyethylene, as described herein, may comprise vinyl groups, for example, allyl groups. Vinyl groups are functional groups which comprise carbon carbon double bonds. The term "vinyl group" as used herein takes is conventional meaning, i.e. the moiety "—CH═CH2". Further, the polyethylene may in addition comprise other functional groups also comprising carbon carbon double bonds. The other functional groups, also comprising carbon carbon double bonds, may be, e.g., vinylidene groups and/or vinylene groups. The vinylene group has either a cis or trans configuration. For the avoidance of doubt, vinylidene groups and vinylene groups are not vinyl groups as the terms are used herein. Typically said unsaturated polyolefins have a double bond content of more than 0.1 double bonds/1000 C-atoms.

Still a further embodiment according to the present invention discloses a semiconductive polymer composition, wherein ethylene vinyl acetate copolymer (a) optionally comprises unsaturation provided by, for example, copolymerising ethylene with vinyl acetate and at least one polyunsaturated comonomer (i.e. to produce a terpolymer) and/or by, for example, using a chain transfer agent, e.g. propylene.

It is well known that e.g. propylene can be used as a comonomer or as a chain transfer agent (CTA), or both, whereby it can contribute to the unsaturation, e.g. the amount of the vinyl groups in the polyethylene. Herein, when copolymerisable CTA, such as propylene, is used, the copolymerised CTA is not calculated to the origin comonomer content.

The polyunsaturated comonomers suitable for the optional unsaturated ethylene vinyl acetate copolymer (a) preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from C8 to C14 non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof.

Typically, and preferably in wire and cable (W&C) applications, the density of the copolymer (a), preferably of the preferred EVA copolymer, is higher than 900 kg/m3. Preferably the density of the copolymer, preferably of the preferred EVA copolymer, is not higher than 960 kg/m3. Typical density ranges include 900 to 960 kg/m3, such as 910 to 950 kg/m3, e.g. 920 to 945 kg/m3.

The MFR2 (2.16 kg, 190° C.) of the copolymer (a), preferably of the preferred EVA copolymer depends on the desired end use application as well known for a skilled person. Preferably, the MFR2 (2.16 kg, 190° C.) of the copolymer (a), preferably of the preferred EVA copolymer, is up to 150 g/10 min, such as up to 100 g/10 min. Typical ranges are from 0.01 to 50, preferably from 0.05 to 40 g/10 min, more preferably from 0.1 to 30 g/10 min, such as from 0.5 to 20 g/10 min, e.g. from 1 to 15 g/10 min.

Ideally, the $MFR_2$ of the ethylene vinyl acetate copolymer (a) is less than the $MFR_2$ of the ethylene vinyl acetate wax (c).

The melting temperature of the copolymer (a) is typically above 50° C., more preferably above 60° C. and most preferably is 80° C. or higher. The melting temperature of the copolymer (a) is preferably below 125° C., more preferably below 120° C., more preferably below 115° C.

Whilst it is within the ambit of the invention for the ethylene vinyl acetate copolymer (a) to comprise one or more comonomers in addition to vinyl acetate, it is preferred if the only comonomer is vinyl acetate, i.e. the copolymer consists of ethylene and vinyl acetate monomer units. Where other comonomers are present, these may be selected from any of those described above as optional "polar" or "non-polar" comonomers. Preferably, the ethylene vinyl acetate copolymer (a) is not a mix or blend of different ethylene vinyl acetate copolymers.

The total comonomer content of the copolymer (a), preferably EVA copolymer as the preferred copolymer (a), is preferably up to 70 wt %, more preferably up to 60 wt %, such as up to 50 wt %. Typically, the comonomer content is in the range 0.001 to 50 wt %, more preferably 0.05 to 40 wt %, still more preferably less than 35 wt %, still more preferably less than 30 wt %, more preferably less than 25 wt %, relative to the total weight of the copolymer. Typical ranges include 0.5 to 40 wt %, preferably of 1 to 35 wt %, more preferably 2 to 30 wt %, such as 3 to 25 wt %, e.g. 5 to 20 wt % of the total amount of said copolymer.

The vinyl acetate content in copolymer (a) is preferably in the range 1 to 35 wt %, more preferably 1.5 to 32 wt %, more preferably 2 to 28 wt %, more preferably 2.5 to 25 wt %, even more preferably 3 to 22 wt %, such as 4 to 20 wt %, especially 5 to 19 wt %, such as 10 to 18 wt %, e.g. 12 to 16 wt % relative to the total weight of the copolymer.

Accordingly, the preferred ethylene vinyl acetate copolymer (a) of the invention is a LDPE copolymer and is preferably produced at high pressure by free radical initiated polymerisation (referred to as high pressure (HP) radical polymerisation). The HP reactor can be e.g. a well-known tubular or autoclave reactor or a combination thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerisation can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The ethylene vinyl acetate copolymer (a) is present in the semiconductive polymer compositions of the invention in an amount of at least 30 wt % or at least 40 wt % or at least 50 wt %, relative to the total weight of the composition as a whole. Preferable amounts may be in the range 30 to 73 wt %, more preferably 30 to 70 wt %, such as 32 to 68 wt %, e.g. 35 to 65 wt % or 45 to 60 wt %.

The ethylene vinyl acetate employed as component (a) is different to the ethylene vinyl acetate wax (c).

Carbon Black (b)

The semiconductive polymer composition of the invention comprises at least 25 wt % carbon black. Depending on the desired use, the conductivity of the carbon black and conductivity of the composition, the amount of carbon black can vary. The semiconductive polymer composition comprises, for example, 25 to 60 wt %, preferably 28 to 55 wt %, more preferably 30 to 50 wt %, e.g. 35 to 45 wt %, carbon black, based on the total weight of the semiconductive polymer composition.

According to at least one example embodiment, the carbon black is present in an amount of at least 25 wt %, such as at least 30 wt %, or at least 35 wt %, relative to the total weight of the semiconductive compositions. Preferably, the carbon black content in the semiconductive compositions does not exceed 45 wt %, or does not exceed 40 wt % relative to the total weight of the semiconductive compositions. Thus, the carbon black may be present in an amount of 25 to 45 wt %, or 25 to 40 wt %, or 30 to 45 wt %, or 30 to 40 wt %, or 34 to 41 wt % relative to the total weight of the semiconductive compositions.

Any carbon black which is electrically conductive can be used. Typically, the carbon black will be a specialty carbon black or a P-type black. Non-limiting examples of suitable carbon blacks include furnace blacks and acetylene blacks.

The carbon black may have a nitrogen adsorption surface area (NSA) of 5 to 400 $m^2/g$, for example of 10 to 300 $m^2/g$, e.g. of 30 to 200 $m^2/g$, when determined according to ASTM D6556-19. Further, the carbon black may have one or more of the following properties: i) a primary particle size of at least 5 nm, e.g. 10 to 30 nm, or 11-20 nm which is defined as the average particle diameter according to ASTM D3849-14, ii) iodine adsorption number of at least 10 mg/g, for example 10 to 300 mg/g, such as 30 to 250 mg/g, e.g. 60 (or 61) to 200 mg/g, or 80 to 200 mg/g, or 100 to 170 mg/g, when determined according to ASTM D-1510-19; and/or iii) oil absorption number (OAN) of at least 30 ml/100 g, for example 50 to 300 ml/100 g, e.g. 50 to 250 ml/100 g, for example 70 to 200 ml/100 g, e.g. 90 to 130 ml/100 g, or 70 to 119 (or 120) ml/100 g, when measured according to ASTM D 2414-19.

One group of suitable furnace blacks have a primary particle size of 28 nm or less. Particularly suitable furnace blacks of this category may have an iodine adsorption number between 60 and 300 mg/g. It is further suitable that the oil absorption number (of this category) is between 50 and 225 ml/100 g, for example between 50 and 200 ml/100 g.

Other suitable carbon blacks can be made by any other process or can be further treated. Suitable carbon blacks for semiconductive cable layers are suitably characterized by their cleanliness. Therefore, suitable carbon blacks have an ash-content of less than 0.2 wt % measured according to ASTM D1506, a 325 mesh sieve residue of less than 30 ppm according to ASTM D1514 and have less than 3 wt %, preferably less than 1 wt % total sulphur according to ASTMD1619.

Furnace carbon black is a generally acknowledged term for the well-known carbon black type that is produced in a furnace-type reactor. As examples of carbon blacks, the preparation process thereof and the reactors, reference can be made to i.a. EP629222 of Cabot, U.S. Pat. Nos. 4,391, 789, 3,922,335 and 3,401,020. As an example of commercial furnace carbon black grades N115, N351, N293, N220 and N550 can be mentioned. To further increase the suitability of such carbon blacks in semiconductive compounds, modifications of these commercial carbon blacks e.g. in terms of cleanliness, pellet properties and surface area are advantageous. Furnace carbon blacks are conventionally distinguished from acetylene carbon blacks which are another carbon black type suitable for the semiconductive polymer composition.

Acetylene carbon blacks are produced in an acetylene black process, e.g. as described in U.S. Pat. No. 4,340,577. Particularly, acetylene blacks may have a particle size of larger than 20 nm, for example 20 to 80 nm. The mean primary particle size is defined as the average particle diameter according to the ASTM D3849-14. Suitable acetylene blacks of this category have an iodine adsorption number between 30 to 300 mg/g, for example 30 to 150 mg/g according to ASTM D1510. Further the oil absorption number (of this category) is, for example between 80 to 300 ml/100 g, e.g. 100 to 280 ml/100 g and this is measured according to ASTM D2414. Acetylene black is a generally acknowledged term and are very well known and e.g. supplied by Denka.

Ethylene Vinyl Acetate Wax (c)

The ethylene vinyl acetate wax (c) may be a high pressure polyethylene, typically, it is a high pressure LDPE, produced in an analogous manner as described above for the ethylene vinyl acetate copolymer (a), for example comprising other additional comonomers, polar and/or non-polar. The ethylene vinyl acetate wax may e.g. be a copolymer of polyethylene with one or more comonomer(s), and may be produced by a high pressure process.

The ethylene vinyl acetate employed as component (c) is different to the ethylene vinyl acetate copolymer (a). Thus, the ethylene vinyl acetate copolymer (a) must not be identical to the ethylene vinyl acetate copolymer (c).

The ethylene vinyl acetate wax (c) may comprise one or more additional comonomers as defined above for the copolymer (a). In one preferred embodiment, the ethylene vinyl acetate wax (c) consists of ethylene and vinyl acetate monomers.

Example vinyl acetate contents for the ethylene vinyl acetate (c) are 1 to 45 wt %, preferably 1 to 35 wt %, more preferably 2 to 30 wt %, even more preferably 3 to 25 wt %, such as 5 to 20 wt %, especially 10 to 20 wt % e.g. 11 to 19 wt % relative to the total weight of the ethylene vinyl acetate wax (c).

The semiconductive polymer composition of the invention comprises at least 1 wt % ethylene vinyl acetate wax (c). The semiconductive polymer composition comprises, for example, 1 to 15 wt %, or 1 to 10 wt %, e.g. 1 to 9 wt %, or 2 to 8 wt %, such as e.g. 3 to 7 wt %, or 4 to 7 wt %, or about 6 wt %, or 1 to 6 wt %, or 1 to 4 wt % ethylene vinyl acetate wax, based on the weight of the semiconductive polymer composition.

In one embodiment, the semiconductive polymer composition comprises 2.5 to 9 wt %, 3 to 9 wt %, or 3 to 8 wt %, ethylene vinyl acetate wax, based on the weight of the semiconductive polymer composition.

According to at least one example embodiment, the ethylene vinyl acetate wax is present in an amount of at least 3 wt %, such as at least 5 wt %, or at least 7 wt %, relative to the total weight of the semiconductive polymer compositions. Preferably, the ethylene vinyl acetate wax content in the semiconductive polymer compositions does not exceed 15 wt %, relative to the total weight of the semiconductive polymer compositions. Thus, the ethylene vinyl acetate wax may be present in an amount of 3 to 15 wt %, or 5 to 15 wt %, or 7 to 15 wt %, or 10 to 15 wt % relative to the total weight of the semiconductive polymer compositions.

According to at least one example embodiment, the ethylene vinyl acetate wax (c) has an MFR2 (2.16 kg, 190° C.) of at least 1200 g/10 min.

An ethylene vinyl acetate wax is herein defined as an ethylene vinyl acetate polymer having an average molecular weight between 800 and 12000 g/mol, preferably between 1000 and 10000 g/mol or between 1000 and 8000 g/mol, more preferably between 2000 and 4000 g/mol or between 2000 and 5000 g/mol.

The ethylene vinyl acetate wax may according to at least one example embodiment have a softening or melting point of between 80 and 130° C., or between 80 and 120° C., such as e.g. between 85 and 105° C. or between 90 and 100° C.

Viewed from another aspect the invention provides a semiconductive polymer composition comprising:
(a) a base polymer of ethylene vinyl acetate copolymer;
(b) at least 25 wt % carbon black; and
(c) 3 to 8 wt % of an ethylene vinyl acetate wax.

Polymer Composition

In addition to components (a) to (c) described above, the semiconductive polymer composition of the invention may comprise further components, typically additives, such as antioxidants, crosslinking boosters, scorch retardants, processing aids, fillers, coupling agents, ultraviolet absorbers, stabilizers, antistatic agents, nucleating agents, slip agents, plasticizers, lubricants, viscosity control agents, tackifiers, anti-blocking agents, surfactants, extender oils, acid scavengers and/or metal deactivators. These additives are well known in the industry and their use will be familiar to the artisan. Any additives which are present may be added as an isolated raw material or in a mixture with a carrier polymer, i.e. in so called master batch.

In a particularly preferred embodiment, the composition of the invention comprises an acid scavenger, which includes compounds which are metal salts of long chain carboxylic acids like metal stearates, lactates, natural or synthetic silicates like hydrotalcites, metal oxides (e.g. magnesium oxide, calcium oxide, zinc oxide), metal carbonates (e.g. calcium carbonate) and metal hydroxides. Ideally, the acid scavenger is a metal stearate, such as calcium stearate, zinc stearate, sodium stearate, lithium stearate or magnesium stearate. Zinc stearate is especially preferred.

If present, the acid scavenger typically forms at least 0.1 wt % of the total weight of the composition as a whole. Example amounts of the acid scavenger are thus 0.1 to 5.0 wt %, preferably 0.2 to 4.0 wt %, more preferably 0.3 to 3.0 wt %, such as 0.4 to 2.0 wt %, or 0.2 to 2.0 wt %, or 0.2 to 1 wt %, relative to the total weight of the polymer composition.

In a further preferable embodiment, the composition comprises an antioxidant. Examples of such antioxidants are as follows, but are not limited to: hindered phenols such as tetrakis[methylene(3,5-di-tert-butyl-4-hydroxyhydro-cinnamate)] methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), 2,2'-thiodiethylenebis-(3,5-di-tert. butyl-4-hydroxyphenyl)-propionate, 4,6-bis (octylthiomethyl)-o-cresol, and thiodiethylene bis(3,5-di-tert-butyl-4-hydroxy)hydrocinnamate; phosphites and phosphonites such as tris(2,4-di-tertbutylphenyl)phosphite and di-tert-butylphenyl-phosphonite; thio compounds such as dilaurylthiodipropionate, dimyristylthiodipropionate, and distearylthiodipropionate; various siloxanes; polymerised 2,2,4-trimethyl-1,2-dihydroquinoline (TMQ), n,n'-bis(1,4-dimethylpentyl-p-phenylenediamine), alkylated diphenylamines, 4,4'-bis(1,1'alpha,alpha-diemethylbenzyl)diphenylamine, diphenyl-p-phenylenediamine, mixed di-aryl-p-phenylenediamines, 2,2'-oxamido bis-(ethyl-3-(3,5-di-tert.butyl-4-hydroxyphenyl)propionate), and other hindered amine antidegradants or stabilizers. A more preferred antioxidant is 4,4'-bis(1,1'-dimethylbenzyl)diphenylamine. A particularly preferred antioxidant is TMQ.

Antioxidants can be used in amounts of 0.1 to 5.0 wt %, preferably 0.1 to 2 wt % or 0.15 to 2 wt %, more preferably 0.2 to 2 wt % or 0.2 to 1.5 wt %, even more preferably 0.25 to 1.0 wt %, such as 0.3 to 0.8 wt %, especially 0.35 to 0.7 wt %, based on the weight of the composition.

Examples of fillers as additives are as follows: clays, precipitated silica and silicates, fumed silica, calcium carbonate, ground minerals, and further carbon blacks. Fillers can be used in amounts ranging from less than about 0.01 to more than about 40 percent by weight based on the weight of the composition.

In embodiments wherein the semiconductive polymer composition is a crosslinkable composition, it may also comprise a crosslinking agent. Typical amounts of crosslinking agent are 0.01 to 4.0 wt %, preferably 0.02 to 2.0 wt %, more preferably 0.03 to 1.5 wt %, such as 0.05 to 1.2 wt %, especially 0.1 to 1.0 wt % relative to the total weight of the composition.

The preferred crosslinking agent is peroxide. Non-limiting examples are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butyl-cumylperoxide, di(tert-butyl)peroxide, dicumylperoxide, butyl-4,4-di(tert-butylperoxy)-valerate, 1,1-di(tert-butylperoxy)-3,3,5-trimethylcyclohexane, tert-butylperoxybenzoate, dibenzoylperoxide, di(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof.

Scorch retarders which may be employed in the present invention include unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. For example, the scorch retarder may be selected from 2,4-diphenyl-4-methyl-1-pentene, substituted or unsubstituted diphenylethylene, or mixtures thereof.

It is preferred if the semiconductive polymer composition is substantially free from, or does not contain, a polyethylene glycol. Hence, the semiconductive composition of the invention is preferably substantially free of a polyethylene glycol (e.g. comprises less than 0.5 wt % polyethylene glycol, preferably less than 0.1 wt % polyethylene glycol, such as less than 0.05 wt % polyethylene glycol, relative to the total weight of the composition). Even more preferably, the semiconductive composition is free of any polyethylene glycol (i.e. contains 0 wt % polyethylene glycol, relative to the total weight of the composition). In other words, said semiconductive polymer composition is preferably a polyethylene glycol-free semiconductive polymer composition. This exclusion also covers PEGs that are block copolymers with polypropylene glycol. Excluded PEGs may have a Mw of 300 to 35000 g/mol.

Viewed from another aspect the invention provides a semiconductive polymer composition free of polyethylene glycol comprising:
(a) a base polymer of ethylene vinyl acetate copolymer;
(b) at least 25 wt % carbon black; and
(c) at least 1 wt % of an ethylene vinyl acetate wax.

Typically, the ethylene vinyl acetate copolymer (a) and the ethylene vinyl acetate wax (c) are the only polymer components present in the polymer composition. However, it is to be understood herein that the polymer composition may comprise further components such as additives which may optionally be added in a mixture with a carrier polymer, i.e. in so called master batch.

According to at least one example embodiment, the semiconductive polymer composition is substantially free from, or does not contain, a rubber, such as e.g. an ethylene-propylene rubber or an ethylene-propylene.unconjugated diene terpolymers. Hence, the semiconductive composition of the invention is preferably substantially free of a rubber (e.g. comprises less than 0.5 wt % rubber, preferably less than 0.1 wt % rubber, such as less than 0.05 wt % rubber, relative to the total weight of the composition). Even more preferably, the semiconductive composition is free of any added rubber (i.e. contains 0 wt % rubber, relative to the total weight of the composition). In other words, said semiconductive polymer composition is preferably a rubber-free semiconductive polymer composition.

According to at least one example embodiment, the vinyl acetate content of component (a) is between 3.0 and 25 wt %, and the amount of component (c) is between 1.0 and 10 wt % and the amount of carbon black (b) in the semiconductive polymer composition is between 34 and 41 wt %. According to yet a further embodiment, the vinyl acetate content of component (a) is between 5.0 and 25 wt %, and the amount of component (c) is between 1.0 and 7 wt % and the amount of carbon black (b) in the semiconductive polymer composition is between 34 and 41 wt %. According to yet a further embodiment, the vinyl acetate content of component (a) is between 5.0 and 20 wt %, and the amount of component (c) is between 2.0 and 8 wt % and the amount of carbon black (b) in the semiconductive polymer composition is between 34 and 41 wt %. According to yet a further embodiment, the vinyl acetate content of component (a) is between 10 and 20 wt %, and the amount of component (c) is between 3 and 7 wt % and the amount of carbon black (b) in the semiconductive polymer composition is between 34 and 41 wt %. According to yet a further embodiment, the vinyl acetate content of component (a) is between 11 and 19 wt %, and the amount of component (c) is between 3 and 7 wt % and the amount of carbon black (b) in the semiconductive polymer composition is between 34 and 41 wt %.

Preparation of Polymer Composition

In a further aspect, the invention provides a process for preparing a semiconductive polymer composition comprising:
(a) a base polymer of ethylene vinyl acetate copolymer;
(b) at least 25 wt % carbon black; and
(c) at least 1 wt % of an ethylene vinyl acetate wax.

The process may e.g. comprising compounding (a) to (c) at a temperature of less than 240° C.

A further embodiment of the present invention discloses a process for producing a semiconductive polymer composition as defined herein, the process comprising mixing and/or blending (e.g. compounding) components (a) to (c) at a temperature below 240° C. Preferable temperature ranges include 155 to 235° C., such as 160 to 230° C.

This mixing at elevated temperature is typically referred to as melt mixing, and will usually occur at more than 10° C. above, preferably more than 25° C., above the melting point of the polymer component(s) and below the undesired degradation temperature of the components.

Said temperature is typically the highest temperature occurring in the compounding step, such as e.g. in the mixer barrel of the compounding equipment subsequent to adding all carbon black, but prior to the discharge of the composition to downstream functions.

The most preferred method of preparation involves compounding the various components, usually via extrusion.

Preferably said preparation process of the invention further comprises a step of pelletising the obtained polymer mixture. Pelletising can be affected in well known manner using a conventional pelletising equipment, such as preferably conventional pelletising extruder which is integrated to said mixer device. The process of the invention can be operated in batch wise or in continuous manner.

Apparatuses used for carrying out the method of the invention are for example single screw or twin screw mixer or a kneading extruder, or a combination thereof, which is preferably integrated to a pelletising device. The apparatus (es) may be operated in batch wise or, preferably, in continuous manner. The process may comprise a further subsequent sieving step before preferable pelletising step which is also conventionally used in the state of the art in the preparation of semiconductive polymer compositions to limit the number of large particles.

According to at least one example embodiment, such apparatus may be a co-kneader comprising a mixer barrel in which the melt-mixing of the composition is carried out, e.g. with one or more inlet hoppers for adding the carbon black, and a discharge extruder or gear pump arranged downstream of the mixer barrel. The co-kneader may e.g. be a single-screw machine comprising an axial oscillation once per revolution, where static pins in a mixer house of the apparatus interact with gaps in the screw. Hereby, an elongational kneading, which provides efficient dispersive and distributive mixing in a relatively short barrel, is provided. Temperature can be controlled by adding the carbon black to the polymer melt in one or more hoppers. The output may e.g. be a 3.5 tons/h and the RPM 750.

By adding 1 to 15 wt % of a ethylene vinyl acetate wax, the power consumption of the compounding equipment, such as e.g. the co-kneader, is reduced compared to the compounding of a corresponding semiconductive polymer compositions, but without the ethylene vinyl acetate wax, or a different amount of ethylene vinyl acetate wax. The reduction in power consumption may e.g. be at least 1%, or at least 3%, or at least 5%, or at least 7%, or at least 9%, or at least 11%, or at least 15%, or at least 20%.

End Applications

A further embodiment of the present invention provides an article, preferably a cable (e.g. a power cable), comprising at least one layer, wherein said layer comprises the semiconductive polymer composition as described herein. A further embodiment of the present invention provides a layer in a multi-layer cable, such as a power cable layer, wherein said layer comprises the semiconductive polymer composition as described herein. The multi-layer cable may e.g. have at least 3 layers, such as e.g. an inner semiconductive layer, an outer semiconductive layer, and an insulation layer arranged there between.

Said layer of the cable comprising the semiconductive polymer composition is preferably a semiconductive layer, and may thus be referred to such interchangeably throughout the text.

Further, the cable of the present invention may, for example, be a power cable which comprises a conductor surrounded by at least a semiconductive layer comprising, preferably consisting of, the polymer composition of the invention.

Ideally, the cable will comprise a conductor surrounded by at least an inner semiconductive layer, an insulation layer and an outer semiconductive layer in given order, wherein the semiconductive layer(s) comprise, preferably consist of, the semiconductive polymer composition as described herein. It is within the ambit of the invention for the semiconductive polymer composition of the inner and outer semiconductive layer to be identical or different.

According to another embodiment of a power cable, the semiconductive layer(s) may be strippable or non-strippable, preferably non-strippable, i.e. bonded. These terms are known and describe the peeling property of the layer, which may be desired or not depending on the end application. Thus, according to at least one example embodiment, said layer is a bonded layer in said multi-layer cable, such as e.g. the inner or outer semiconductive layer arranged in contact with the conductor of the cable.

In case of a strippable semiconductive layer, the EVA copolymer of the invention is more polar having the content of polar comonomers of at least 20.0 wt %, such as at least 25.0 wt %, preferably at least 26.0 wt % more preferably from 27.0 to 35.0 wt %, based on the weight of said EVA copolymer, and may contain further polar polymer components to contribute the strippability. Preferably a non-strippable semiconductive layer (e.g. the inner or outer layer) has a content of polar comonomers of less than 25.0 wt %, preferably less than 20.0 wt %, more preferable of from 10.0 to 18.0 wt %. In some embodiments the polar comonomer content as low as of 6.0 to 15.0 wt % based on said EVA copolymer may be desired. Thus, according to at least one example embodiment, the semicondutive polymer composition has a content of polar comonomers of less than 25.0 wt %, preferably less than 20.0 wt %, more preferable of from 10.0 to 18.0 wt % or as low as of 6.0 to 15.0 wt % based on said EVA copolymer. In both strippable and non-strippable cases the layer is preferably crosslinkable.

According to at least one example embodiment, the semiconductive layer of the invention has a strip force of 8 kN/m or more, preferably more than 10 kN/m. The method used for measuring such strip force is well known and is e.g. described in the method section under "Strip force 90°" in WO2019002449.

The term "conductor" means herein above and below that the conductor comprises one or more wires. Moreover, the cable may comprise one or more such conductors. Preferably the conductor is an electrical conductor and comprises one or more metal wires.

The cable of the invention is preferably a power cable selected from a MV, HV or EHV cable. The cable is preferably a MV cable, HV cable or EHV cable.

Insulating layers for medium or high voltage power cables generally have a thickness of at least 2 mm, typically of at least 2.3 mm, and the thickness increases with increasing voltage the cable is designed for.

As well known the cable can optionally comprise further layers, e.g. layers surrounding the insulation layer or, if present, the outer semiconductive layers, such as screen(s), a jacketing layer(s), other protective layer(s) or any combinations thereof.

The cable of the invention may be crosslinkable. Accordingly, further preferably the cable is a crosslinked cable, wherein at least one semiconductive layer comprises crosslinkable polymer composition of the invention which is crosslinked before the subsequent end use.

The most preferred cable of the invention is a power cable which is preferably crosslinkable. Such a power cable ideally comprises a conductor surrounded by at least an inner semiconductive layer, an insulation layer and an outer semiconductive layer in given order, wherein the semiconductive layer(s) comprises, preferably consists of, the semiconductive polymer composition as described herein. Preferably at least the inner semiconductive layer comprises the polymer composition of the invention, as defined above or below, or in claims, including the preferred embodiments thereof. In this preferred embodiment of cable, the outer semiconductive layer may optionally comprise the polymer composition of the invention which can be identical or different from the polymer composition of the inner semiconductive layer. Moreover, at least the polymer composition of the invention of the inner semiconductive layer is crosslinkable, preferably peroxide crosslinkable, and is crosslinked before the subsequent end use. Preferably also the insulation layer is crosslinkable and is crosslinked before the subsequent end use. The outer semiconductive layer may optionally be crosslinkable and thus be non-crosslinked or crosslinked, depending on the desired end application.

The invention further provides a process for producing a cable, preferably a power cable, wherein the process comprises the steps of:

applying on one or more conductors, a layer comprising a semiconductive composition as defined herein.

According to at least one example embodiment, the process for producing a cable comprises the steps of:
(i) providing and mixing, preferably meltmixing in an extruder, a polymer composition, preferably in the form of pellets, as hereinbefore defined;
(ii) applying a meltmix of the polymer composition obtained from step (i), preferably by (co)extrusion, on a conductor to form at least one semiconductive layer; and
(iii) optionally, and preferably, crosslinking the obtained at least one semiconductive layer in the presence of the crosslinking agent.

In a further embodiment, the invention comprises a process for producing a cable, preferably a power cable, wherein the process comprises the steps of:
(i) providing and mixing, preferably meltmixing in an extruder, a first semiconductive composition as hereinbefore defined, preferably in the form of pellets, for the inner semiconductive layer,
providing and mixing, preferably meltmixing in an extruder, a polymer composition for the insulation layer,
providing and mixing, preferably meltmixing in an extruder, a polymer composition for the insulation layer,
providing and mixing, preferably meltmixing in an extruder, a second semiconductive composition comprising a polymer, a carbon black and optionally further component(s), preferably in the form of pellets, for the outer semiconductive layer;

(ii) applying on a conductor, preferably by coextrusion,
a meltmix of the first semiconductive composition obtained from step (i) to form the inner semiconductive layer,
a meltmix of polymer composition obtained from step (i) to form the insulation layer, and
a meltmix of the second semiconductive composition obtained from step (i) to form the outer semiconductive layer,
wherein at least one of the first semiconductive composition of the obtained inner semiconductive layer and the second semiconductive composition of the obtained outer semiconductive layer, preferably at least the first semiconductive composition of the obtained inner semiconductive layer, comprises, preferably consists of, a polymer composition of the invention.

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one extrusion head, or sequentially using more than one extrusion heads.

As well known a meltmix of the polymer composition or component(s) thereof, is applied to form a layer. The mixing step can be carried out in the cable extruder. The meltmixing step may comprise a separate mixing step in a separate mixer, e.g. kneader, arranged in connection and preceding the cable extruder of the cable production line. Mixing in the preceding separate mixer can be carried out by mixing with or without external heating (heating with an external source) of the component(s).

In general, carbon black (b) and the ethylene vinyl acetate wax (c) are mixed with the ethylene vinyl acetate copolymer (a), e.g. by meltmixing, and the obtained meltmix is pelletized to pellets for use in the cable production methods described above. Pellets mean herein generally any polymer product which is formed from a reactor-made polymer (obtained directly from the reactor) by post-reactor modification to solid polymer particles. Pellets can be of any size and shape. The obtained pellets are then used for cable production.

All or part of the optional other component(s), such as further polymer component(s) or additive(s) can be present in the polymer composition before providing to the mixing step (i) of the cable preparation process or can be added, e.g. by the cable producer, during the mixing step (i) of the cable production process.

If, and preferably, the polymer composition is crosslinked after cable formation, then the crosslinking agent is preferably a peroxide, which can be mixed with the components of the polymer composition before or during mixing step (i). Preferably, the crosslinking agent, preferably peroxide, is impregnated to the solid polymer pellets of the polymer composition. The obtained pellets are then provided to the cable production step.

Most preferably, the polymer composition of the invention is provided to the mixing step (i) of the cable production process in a suitable product form, such as a pellet product.

In case the polymer composition is silane crosslinkable then the crosslinking agent is typically not present in the polymer composition before the cable formation, but the crosslinking agent is usually added to the insulation layer composition and after cable is formed the crosslinking agent migrates during the crosslinking step to the semiconductive layer comprising the polymer composition of the invention.

In the preferred cable production process the obtained cable is crosslinked in step (iii).

As mentioned, the polymer composition is preferably crosslinkable and preferably the pellets of the polymer composition comprise also the peroxide before providing to the cable production line.

In above crosslinking process step (iii) of the invention crosslinking conditions can vary depending i.a. on the used crosslinking method, and cable size. The crosslinking of the invention is effected e.g. in a known manner preferably in an elevated temperature. A skilled person can choose the suitable crosslinking conditions e.g. for crosslinking via radical reaction or via hydrolysable silane groups. As non-limiting example of a suitable crosslinking temperature range, e.g. at least 150° C. and typically not higher than 360° C.

Determination Methods

Unless otherwise stated in the description or experimental part the following methods were used for the property determinations.

wt %=weight percent

Melt Flow Rate: The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$) or 21.6 kg ($MFR_{21}$).

Density: Low density polyethylene (LDPE): The density was measured according to ISO 1183-2. The sample preparation was executed according to ISO 1872-2 Table 3 Q (compression moulding).

Surface smoothness: Surface Smoothness Analysis (SSA) method uses a tape sample consisting of the semiconductive polymer composition as described below, and is a well-known method used in the prior art for determining the surface smoothness of semiconductive polymer materials Surface Smoothness Analysis (SSA) is designed to measure and record surface irregularities, called pips, on the extruded semiconductive material. The method is used for analysis directly linked to production, so called on-line analysis. The SSA equipment measures and sorts pips of different sizes based on the half-height width. Depending on the product there is a specified maximum number of pips in each size-class. The principle of detection of pips with SSA is measurement of the tape shadow over a horizon. The extruded tape passes a shear pin which is illuminated from one side with a light source. If a pip or other defect occur on the surface it gives rise to a shadow which is recorded on a one-dimensional camera located on the other side of the tape. The camera consists of light-sensitive pixels which measure the height and width of the defect. The height of the amount of light that passes the horizon and the width by the number of pixels that are shaded are recorded and detected as pips. Detected pips are reported in the magnitude of half-height width (W50) and height (h) in different size with the unit number of pips per square parsed tape ($no/m^2$). The definition of half-height width is the width the pips have at half the height. The test system is further generally described e.g. in WO0062014 of Semyre.

Tape Sample Preparation

About 4 kg of pellets of the semiconductive polymer composition were taken and extruded into a form of tape sample using Collin single screw of 20 mm and 25D extruder (supplier Collin) and following temperature settings at different sections, starting from the inlet of the extruder: 95° C., 120° C., 120° C. and 125° C. to obtain a temperature of 125° C. of the polymer melt. The pressure before the extrusion plate is typically 260 Bar (26 MPa), residence time is kept between 1 and 3 minutes and typical screw speed is 50 rpm, depending on the polymer material as known for a skilled person.

Extruder die opening: 30 mm×1 mm
Thickness of the tape: 500±20 μm
Width of the tape: 18 mm The tape is cooled with air to solidify it completely before subjecting to a camera-scanning (detection) zone of the SSA-instrument which locates at a distance of 50 cm from the outlet of die.

The measurement area: Camera of SSA-instrument scans the tape surface while the tape moves with a given speed. The scanning width is set to exclude the edge area of the tape. The scanning is effected on along the tape to correspond to a measurement area of 1 m2. Further details are given below.

SSA Determination of the Tape Sample

The test is based on an optical inspection of the obtained extruded tape that is passed in front of an optical scanner able to scan even a large surface at high speed and with good resolution. The SSA-instrument is fully computerised and during the operation it automatically stores information about positions and sizes of pips found for statistical evaluation. "Pip" means herein a smaller burl with a height at least one order of magnitude higher than the surrounding background roughness. It is standing alone and the number per surface area is limited.

Height is the distance between the base line (=surface of the tape) and the highest point of a pip. Half height is defined as the width of the pip at 50% of its height (W50) measured from the baseline. For the half height measurement the surface of the tape sample is taken as the baseline. Pip is referred herein above and below as a "particle protruding, from the surface of the tape". And thus the "half height of said particle protruding from the surface of the tape sample" as used herein in the description and claims is said half height width (W50).

The instrument was SSA-analysing instrument of Semyre Photonic Systems AB, Sweden.

Hardware: PC via Image Pre Processor
Software: NOPINIT
Camera type: spectrofotograph camera from Dalsa with 2048 pixels. It was on-line camera with line frequency of 5000.
Light source: intensity regulated red LED.
The width resolution of the pip (particle): 10 μm
The height resolution of the pip (particle): 1.5 μm
Tape speed in SSA-instrument: 50 mm/s The horizon of tape surface is created of a rotating metal shaft. The light source and camera are directly aligned with no angel with a focal point on the horizon.

The scanning results are for 1 m2 area of tape and expressed as number of particles per m2 having a width larger than 150 μm at a half height of said particle protruding from the tape surface (=baseline), number of particles per m2 having a width larger than 200 μm at a half height of said particle protruding from the tape surface (=baseline), and number of particles per m2 having a width larger than 500 μm at a half height of said particle protruding from the tape surface (=baseline).

The given values represent an average number of particles obtained from 10 tape samples prepared and analysed for a semiconductive composition under determination.

Experimental Part

The following components were used:

EVA copolymer (a): A commercially available copolymer of ethylene with vinyl acetate (Elvax 550A) produced in a tubular reactor of a high pressure polymerisation process, MFR (190° C., 2.16 kg) of 8 g/10 min, vinyl acetate (VA) content of 15 wt %.

Carbon black (b): A commercially available P-type furnace black (Printex Alpha A) with the following properties:
  Iodine number: 112-124 [mg/g] (ASTM D1510-19)
  Oil absorption number: 92-104 [ml/100 g] (ASTM D2414-19)
  Mean Primary Particle size 11-20 nm (ASTM D3849-14)

Ethylene vinyl acetate wax (c): A commercially available ethylene vinyl acetate wax from BASF (Luwax EVA 3), which is an ethylene vinyl acetate copolymer with the following properties:
  Melting point (DSC): 93-98° C. (DIN 51007)
  Recrystallisation point (DSC): 92-97° C. (DIN 51007)
  Dropping point (Ubbelohde): 98-104° C. (DIN 51801; ASTM D-566)
  Penetrometer value at 23° C.: 1-2 dmm (DIN 51579; ASTM D-1321)
  Melt viscosity at 120° C.: 1200-1500 mm2/s (DIN 51562; ASTM D-2162)
  Density at 23° C.: 0.935-0.955 g/cm3 (DIN 53479; ASTM D-792)
  VAc content (IR spectrum) 13-15%.

Acid scavenger: A commercially available zinc stearate (Zinkum). In this particular experimental part, a zink stearate masterbatch using 20% neat zink stearate, brand Zinkum, was used in the above mentioned EVA copolymer (a).

Antioxidant: TMQ: polymerised 2,2,4-trimethyl-1,2-dihydroquinoline, melt point: 80-135° C., CAS: 26780-96-1.

Six inventive and one reference composition were prepared with constituents as shown in Table 1. The compositions were compounded by means known to those skilled in the art. In these examples, the compounding equipment was a X-Compound CK 45 machine (a kneader). The kneader power required during compounding for Inventive compositions 1 to 6 as well as the reference composition are shown in Table 2. It is surprisingly observed that when a semiconductive polymer composition containing the ethylene vinyl acetate wax is produced the kneader power requirement is reduced. The output (25 kg/h at 300 rpm) for the kneader is the same for all compositions. The smoothness result for Inventive composition 3 is shown in Table 3.

TABLE 1

Inventive and comparative examples (all contents in wt %).

| | Base polymer EVA | Carbon black | Acid scavenger | EVA wax | Antioxidant |
|---|---|---|---|---|---|
| Reference composition | 55.35 | 39 | 5 | — | 0.65 |
| Inventive composition 1 | 55.35 | 39 | 3 | 2 | 0.65 |
| Inventive composition 2 | 53.35 | 39 | 3 | 4 | 0.65 |
| Inventive composition 3 | 51.35 | 39 | 3 | 6 | 0.65 |
| Inventive composition 4 | 50.35 | 39 | 3 | 7 | 0.65 |
| Inventive composition 5 | 49.35 | 39 | 3 | 8 | 0.65 |
| Inventive composition 6 | 47.35 | 39 | 3 | 10 | 0.65 |

TABLE 2

The power consumption for the different compositions

| Examples | Kneader power consumption (kW) |
|---|---|
| Reference composition | 6.5 |
| Inventive composition 1 | 6.3 |
| Inventive composition 2 | 6.1 |
| Inventive composition 3 | 5.9 |
| Inventive composition 4 | 5.6 |
| Inventive composition 5 | 5.2 |
| Inventive composition 6 | 5.0 |

TABLE 3

Smoothness

| Examples | SSA (pips > 0.15) |
|---|---|
| Reference composition | 14 |
| Inventive composition 1 | 16 |
| Inventive composition 2 | 20 |
| Inventive composition 3 | 24 |
| Inventive composition 4 | 19 |
| Inventive composition 5 | 48 |
| Inventive composition 6 | 372 |

The reference composition have the desired excellent smoothness. As evident the inventive compositions 1-4 show similar excellent smoothness, while performance decreases somewhat for inventive composition 5 and even more for inventive composition 6.

The invention claimed is:

1. A semiconductive polymer composition comprising:
   (a) a base polymer of ethylene vinyl acetate copolymer comprising 3 to 22 wt % vinyl acetate relative to the total weight of the copolymer;
   (b) at least 25 wt % of carbon black, wherein the carbon black has an iodine adsorption number of at least 10 mg/g when determined according to ASTM D-1510-19; and/or an oil absorption number of at least 30 ml/100 g when measured according to ASTM D 2414-19;
   (c) at least 1 wt % of an ethylene vinyl acetate wax;
   (d) at least 0.1 wt % of an acid scavenger, and
   wherein the semiconductive polymer composition is free of polyethylene glycol.

2. The semiconductive polymer composition as claimed in claim 1,
   further comprising at least one of the following components:
   (d) 0.1 to 5 wt % of the acid scavenger, or
   (e) 0.1 to 5 wt % of an antioxidant.

3. The semiconductive polymer composition as claimed in claim 1, wherein the ethylene vinyl acetate copolymer (a) is present in an amount of at least 30 wt %, relative to the total weight of the semiconductive polymer composition.

4. The semiconductive polymer composition of claim 1, wherein the ethylene vinyl acetate wax (c) is present in an amount of 1 to 10 wt %, relative to the total weight of the semiconductive polymer composition.

5. The semiconductive polymer composition of claim 1, wherein the ethylene vinyl acetate copolymer (a) has a vinyl acetate content of 4 to 20 wt %, relative to the total weight of the copolymer.

6. The semiconductive polymer composition of claim 1, wherein the ethylene vinyl acetate copolymer (a) has an MFR2 from 0.01 to 50 g/10 min.

7. The semiconductive polymer composition of claim 1, wherein carbon black (b) is present in an amount of 25 to 60 wt %.

8. The semiconductive polymer composition of claim 1, wherein the ethylene vinyl acetate wax (c) has an average molecular weight of between 800 and 12000 g/mol.

9. The semiconductive polymer composition of claim 1, wherein the composition does not comprise a rubber.

10. The semiconductive polymer composition of claim 1, wherein the ethylene vinyl acetate wax is an energy reducing component resulting in a reduced energy consumption during compounding of the semiconductive polymer composition when compared to a corresponding composition having no ethylene vinyl acetate wax, or having a different amount of ethylene vinyl acetate wax.

11. The semiconductive composition of claim 1, wherein said composition, subsequent to being compounded in a compounding step, has the same, or similar, smoothness compared to a corresponding semiconductive composition having no ethylene vinyl acetate wax.

12. The semiconductive polymer composition as claimed in claim 1 comprising:
(c) 3 to 8 wt % of an ethylene vinyl acetate wax.

13. An article comprising semiconductive layer(s) which is/are obtained from a semiconductive polymer composition as claimed in claim 1, wherein the article comprises a layer in a multi-layer cable.

14. A process for producing a cable comprising the steps of: applying on one or more conductors, the layer comprising a semiconductive polymer composition as defined in claim 1.

15. A process for preparing a semiconductive polymer composition comprising:
(a) a base polymer of ethylene vinyl acetate copolymer comprising 3 to 22 wt % vinyl acetate relative to the total weight of the copolymer;
(b) at least 25 wt % of carbon black, wherein the carbon black has an iodine adsorption number of at least 10 mg/g when determined according to ASTM D-1510-19; and/or an oil absorption number of at least 30 ml/100 g when measured according to ASTM D 2414-19;
(c) at least 1 wt % of an ethylene vinyl acetate wax, and
(d) at least 0.1 wt % of an acid scavenger;
wherein the semiconductive polymer composition is free of polyethylene glycol; and
said process comprising compounding (a) to (d) in a compounding equipment.

16. The process as claimed in claim 15, wherein a power consumption of the compounding equipment is reduced compared to the compounding of a corresponding semiconductive polymer composition as in claim 15, but without the ethylene vinyl acetate wax, or a different amount of ethylene vinyl acetate wax, and wherein said reduction in power consumption being at least 1.

17. A process as claimed in claim 15, wherein the semiconductive polymer composition further comprises at least one of the following components:
(d) 0.1 to 5 wt % of the acid scavenger, or
(e) 0.1 to 5 wt % of an antioxidant.

18. A process for producing a cable comprising the steps of: applying on one or more conductors, a layer comprising the semiconductive polymer composition as prepared according to claim 15.

* * * * *